United States Patent [19]

Joseph

[11] 4,225,361
[45] Sep. 30, 1980

[54] GYPSUM PLASTER

[75] Inventor: Christian M. Joseph, Auzouer-Chateaurenault, France

[73] Assignee: Manufacture de Produits Chimiques Protex S.A., Paris, France

[21] Appl. No.: 969,569

[22] Filed: Dec. 14, 1978

[30] Foreign Application Priority Data

Dec. 14, 1977 [FR] France ................................. 77 38540

[51] Int. Cl.³ ............................................ C04B 11/14
[52] U.S. Cl. ..................................... 106/111; 106/314
[58] Field of Search .................. 106/90, 111, 314, 315

[56] References Cited

U.S. PATENT DOCUMENTS

| 3,346,487 | 10/1967 | Iriani et al. ............................. 106/90 |
| 3,346,488 | 10/1967 | Lyons et al. ............................ 106/90 |
| 3,941,772 | 3/1976 | Ploger et al. ......................... 106/111 |
| 4,034,086 | 7/1977 | Ploger et al. ......................... 106/111 |

Primary Examiner—James Poer
Attorney, Agent, or Firm—Browdy and Neimark

[57] ABSTRACT

Gypsum and anhydrite plaster is improved by adding at least one alkylene diphosphonic acid or water soluble salt thereof, represented by the following formula:

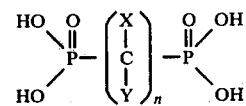

wherein X is hydrogen or lower alkyl of 1–4 carbons, Y is hydrogen, hydroxy or lower alkyl of 1–4 carbons, and $n$ is 1–10. The plaster is found to have an increased finishing time, while the quantity of water necessary is reduced and the mechanical strength of the finished plaster is improved.

7 Claims, No Drawings

GYPSUM PLASTER

FIELD OF INVENTION

The present invention relates to improved compositions of gypsum or anhydrite plaster that are useful in plaster coating and for other gypsum base preparations in the building industry.

BACKGROUND OF THE INVENTION

Plaster, an inexpensive, easy to make product, in great supply, would constitute a quality binding and building material if, when used, it did not exhibit a certain number of serious drawbacks. Its three main drawbacks are a too rapid setting rate, the need to use too great an amount of mixing water and the mediocre mechanical strength of the product.

Actually, one of the main problems encountered in using plaster is the difficulty in obtaining a composition that, while beginning to harden shortly after application, is still able to be worked, i.e., smoothed with a trowel or finished in any other suitable way before setting to give a hard coating. If this finishing time or setting rate is too fast, the plaster acquires a final hardness before having been subjected to the finishing treatment. The influence of this drawback on the economic level is considerable because only small amounts of plaster can be prepared and applied in a necessarily short period. Thus, two objectives are aimed at: a suitable delay of the moment when setting begins (frequently called the flow point) and a sufficiently reduced setting rate (rather long finishing time).

Numerous additives, well known in the prior art, make it possible to achieve the first objective, but the second poses many unsolved problems.

The need to use too high amounts of mixing water also causes concern, particularly because of the very long and, thereby onerous, drying times. Thus, if 90% mixing water is used—from which 20% for crystallization and 16% for normal moisture are deducted—there remains 54% water, or about 10 to 12 kg water per m$^2$ for a coating 2 cm thick. The resulting mediocre mechanical resistances come in part from the too high amounts of water used for mixing the plaster.

Many attempts have already been made to extend the finishing time, but none of them have given entirely satisfactory results because of secondary effects that quite often are very bothersome. German Pat. No. 742,023 describes the use of nitrilotriacetic acid and its salts, but in practice this additive has to be used with a water-holding agent to improve the workability and consistency of the plaster and at times with a gluing agent to regulate the finishing time.

Hydrolized proteins of animal or vegetable origin, described in U.S. Pat. Nos. 2,207,336; 2,383,252; 2,412,156 and in Canadian Pat. No. 408,094, cause changes in color of the plasters thus modified which go from white to more or less deep yellow, while the mechanical resistances are reduced. Setting retardants, such as phosphoric and citric acids (German Pat. No. 613,105), sodium hexametaphosphate (U.S. Pat. No. 2,216,207), and magnesite (Soviet Pat. No. 64,569) either require a much greater amount of mixing water than pure plaster or cause a reduction of the mechanical properties of the plasters thus modified.

On the other hand, there have already been attempts to reduce the amount of plaster mixing water, although when it is desired both to delay setting of the plaster and to reduce its amount of mixing water, it is necessary to resort to two specific products: a retardant and a fluidizing agent or water reducer. However, their undesirable secondary effects most often are additive, and quite often the fluidizing agent works against the action of the setting retardant; hence there exists the need of putting in a larger dose of setting retardant to obtain the same delaying effect, all of this involving a very considerable increase in the cost of the plaster thus treated.

SUMMARY OF THE INVENTION

It has now been discovered that addition of alkylene diphosphonic acids, their water soluble salts or mixtures of these acids and/or their water soluble salts, to the plaster mixing water or other plaster base preparations to which have been added other binders (lime, for example) or granulate (sand, stone powder, etc), makes it possible to obtain optimal finishing times, while reducing the amount of mixing water, which has the effect of improving the mechanical resistance of plasters or other plaster base preparations.

The term "plaster" should be understood as including any product obtained by more or less thorough dehydration and pulverizing of natural or artificial raw materials (gypsum or anhydrite) essentially containing hydrated calcium sulfate.

DETAILED DESCRIPTION OF THE EMBODIMENTS

Thus, this invention has for its object additive compositions for plaster base mixtures of gypsum or anhydrite that include one of more alkylene diphosphonic acids represented by the following general formula:

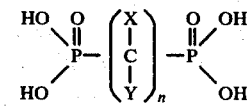

wherein X is a hydrogen atom or a lower alkyl group containing 1 to 4 carbon atoms, Y is a hydrogen atom, a hydroxy radical or a lower alkyl group containing from 1 to 4 carbon atoms and n is a whole number between 1 and 10.

Of the alkylenediphosphonic acids that can be used in the compositons according to the invention, there can be cited in particular:
methylene diphosphonic acid,
ethylidene diphosphonic acid,
isopropylidene diphosphonic acid,
1-hydroxy ethylidene diphosphonic acid,
hexamethylene diphosphonic acid,
trimethylene diphosphonic acid,
decamethylene diphosphonic acid,
1-hydroxy propylidene diphosphonic acid,
1,6-dihydroxy-1,6-dimethyl-hexamethylene diphosphonic acid,
1,4-dihydroxy-1,4-diethyl-tetramethylene diphosphonic acid,
1,3-dihydroxy-1,3-dipropyl-trimethylene diphosphonic acid,
1,4-dibutyl-tetramethylene diphosphonic acid,
dihydroxy-diethyl-ethylene diphosphonic acid,
tetrabutyl-butylene diphosphonic acid,
4-hydroxy-6-ethyl-hexamethylene diphosphonic acid, The alkylene diphosphonic acids and their salts can be prepared by ways well known in the art, one of these comprising a first stage of preparing the corresponding ester by the following general reactions:

for alkylene diphosphonic acid esters where n is greater than 1:

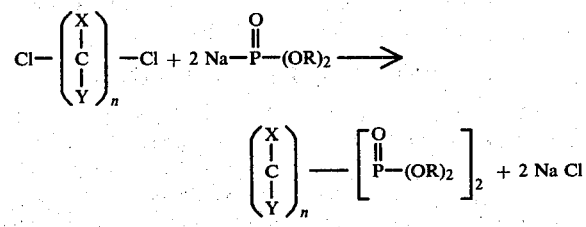

for alkylidene diphosphonic acid esters where n=1

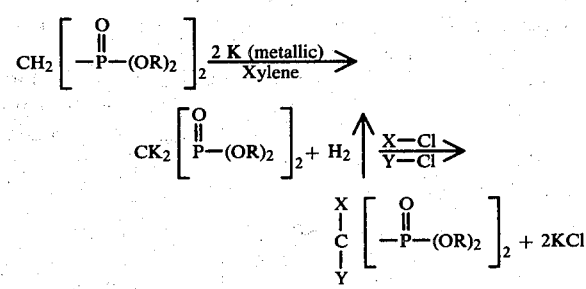

for alkylene diphosphonic acid esters:

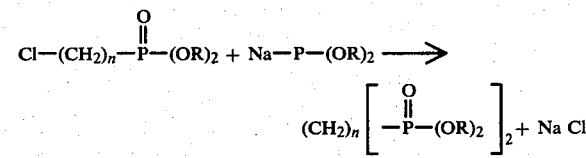

for 1-hydroxy-alkylene diphosphonic acid esters:

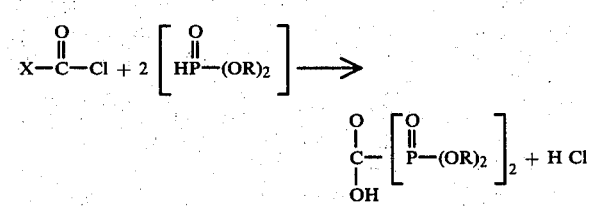

In the formulas mentioned above, n, X and Y are the same as in the preceding general formula and R represents an alkyl group.

Finally, the alkylene diphosphonic acids can be obtained by a process well known in the art: hydrolysis of the corresponding ester by a strong inorganic acid such as, for example, hydrochloric acid.

Although in general all water soluble salts of alkylene diphosphonic acids can be used in the composition according to the present invention, the sodium salt is preferred, in particular the tetrasodium salt. However, other salts of alkali metals, such as potassium, lithium or similar salts, and mixtures of alkali metal salts can be substituted for it. Further, all the water soluble salts, such as ammonium salts or amine salts, which have characteristics similar to the salts of alkali metals, can be used to embody the invention. In particular, amine salts prepared from low molecular weight amines, i.e., having a molecular weight less than 300, and more particularly alkylamines, alkylene amines, and alkanol amines containing no more than two groups of amines such as ethylamine, diethylamine, propylamine, propylene amine, hexylamine, 2-ethylhexamine, N-butylethanolamine, triethanolamine and the like, are preferred amine salts of the invention.

The additive composition according to the present invention can be used in the form of dehydrated powder or in the form of an aqueous solution in a concentration that can reach 50%, depending on the nature of the salt.

The addition to the plaster or plaster base composition can be made at a rate of 0.001 to 2 parts per hundred, preferably from 0.005 to 0.5 parts per hundred dry in relation to the plaster.

The additive compositions according to the invention can be:

either premixed dry with plaster when packaged in powder form, or very easily introduced into the mixing water when the additives are in liquid form either as they are or in the form of a dilute solution when the dosage is difficult to make in the original concentration.

These compositions can be used in the plaster alone or in association with other auxiliary agents (water repellants, fungicides, dyes, etc.) or with other binders (lime, for example) or finally with inorganic or organic aggregates (sand, stone powder, etc.) to make a concrete, mortar or various coatings.

This invention will be better understood from the following examples which describe in a non-limiting way, improvements obtained with the compositons according to the invention.

In these examples, the parts per hundred (p.p.h.) are by weight, unless otherwise indicated. All the tests were made with fine building plaster indicated by "PFC 2" according to French standard NF/B 12-301.

EXAMPLE 1

In each of these tests "PFC 2" plaster was mixed with distilled water at 20°±1° C. containing increasing doses of an additive according to the present invention, which, in the present case, was 1-hydroxyethylidene diphosphonic acid. There was determined the amount of water in relation to the plaster for a defined volume of mixture to give a determined spread. Then the beginning of setting was determined for the mixture thus obtained.

(a) Consistency Test

There were weighed 120 g of distilled water of 20°±1° C. in a beaker, 200 g of plaster "PFC 2" in another (W/P=0.6 at the start). In less than 30 seconds the plaster was poured into the water and stirred. Stirring was continued for a total of 1.5 minutes. Then the resulting paste was poured into a stainless steel cylinder, with an inside diameter of 50 mm and a height of 50 mm, placed on a glass plate. The surface of the paste was cut off at the upper level of the cylinder. After 15 seconds waiting, the cylinder was suddenly lifted: the paste spread. An effort was made to obtain a cake with the average of the two perpendicular diameters being between 15 and 16 cm. If this did not happen, the amount of water was modified in the standard way.

(b) Beginning of Setting:

The beginning of setting ws determined in an air conditioned room (20°±1° C., 65% relative humidity) on the cake of paste with standard consistency (15 cm<φ<16 cm). At regular intervals a knife blade was lightly passed and it was considered that setting had started when the lips of the cut did not close. The period of the beginning of setting was counted from the time of putting the plaster and water in contact.

The results are given in table I.

TABLE I

| Test No. | 1-Hydroxy-ethylidene Diphosphonic Acid: p.p.h. with respect to the plaster (dry materials) | Ratio $\frac{W}{P}$ (Water to Plaster) to have a fixed consistency (15 cm < φ < 16 cm) | Time to Start of Setting In Minutes |
|---|---|---|---|
| 1. Pure plaster | 0 | 0.600 | 28 |
| 2. Modified plaster | 0.01 | 0.595 | 43 |
| 3. Modified plaster | 0.025 | 0.590 | 55 |
| 4. Modified plaster | 0.05 | 0.580 | 73 |
| 5. Modified plaster | 0.075 | 0.570 | 90 |
| 6. Modified plaster | 0.1 | 0.565 | 120 |
| 7. Modified plaster | 0.15 | 0.560 | 185 |

As can be seen from table I, 1-hydroxy-ethylidene diphosphonic acid has a fluidizing action in the plaster (it notably reduces the amount of water necessary to obtain fixed consistency). Further, it considerably increases the period before the beginning of setting.

EXAMPLE 2

In each of these tests, "PFC 2" plaster was mixed with distilled water at 20°±1° C. containing increasing doses of 1-hydroxy-ethylidene diphosphonic acid, so that the ratio by weight of water to plaster was 0.6. Stirring was performed until a uniform, fluid paste was obtained. When the mixture began to thicken, the composition was tested by using as the test apparatus a VICAT plunger unit comprising a 300-g plunger with a needle with a section of 1 mm² (standard ASTM C 472-68). For each test, which occurred in the air conditioned room (20°±1° C., relative humidity 65%), the needle was allowed to sink into the paste at 1 minute intervals, until the hole made by the needle remained.

This stage of hardening of the paste is called the "flow point."

The operation was continued in the same way until the needle sank no more than 5 mm in the paste.

This stage is called the "spread point."

The time between the flow point and the spread point is taken as the finishing time.

Table II shows the compositions prepared and tested and for each composition the time required to reach the flow point, the spread point and the finishing time.

TABLE II

| Test No. | 1-Hydroxy-ethylidene Diphosphonic Acid: of Plaster (dry) p.p.h. | Flow Point in Minutes | Spread Point in Minutes | Finishing Time in Minutes |
|---|---|---|---|---|
| 8. Pure Plaster | 0 | 14 | 25 | 11 |
| 9. Modified Plaster | 0.01 | 17 | 37 | 20 |
| 10. Modified Plaster | 0.025 | 19 | 43 | 24 |
| 11. Modified Plaster | 0.05 | 22 | 57 | 35 |
| 12. Modified Plaster | 0.075 | 58 | 100 | 42 |
| 13. Modified Plaster | 0.10 | 80 | 140 | 60 |
| 14. Modified Plaster | 0.15 | 108 | 200 | 92 |
| 15. Modified Plaster | 0.20 | 185 | 300 | 115 |

As can be clearly seen in table II, 1-hydroxy-ethylidene diphosphonic acid incorporated in the plaster causes a delay of the moment when setting begins (increase of the flow point) but also simultaneously causes a sufficiently reduced setting speed (increase of the finishing time).

EXAMPLE 3

In each of these tests, "PFC 2" plaster was mixed with distilled water at 20°±1° C. containing increasing doses of various water soluble salts of alkylene diphosphonic acid.

(a) Consistency Test

The amount of water was determined in relation to the plaster so that a defined volume of the previous mixtures would give a determined spread (15 cm < φ < 16 cm) by the same mode of operation as in example 1.

(b) Test to Determine the Finishing Time

A series of the previous compositions were prepared so that the ratio of water to plaster was 0.6. Then the compositions were evaluated for their flow and spread points and their finishing time as described in example 2.

The results are given in table III.

TABLE III

| Test No. | Additive Dose p.p.h. of Plaster (dry) | Ratio $\frac{W}{P}$ to Have a Fixed Consistency (15 < φ < 16) | Flow Point in Minutes | Spread Point in Minutes | Finishing Time in Minutes |
|---|---|---|---|---|---|
| 16 | 0: Pure Plaster | 0.600 | 14 | 25 | 11 |
| Additive: Tetrasodium - 1 Hydroxy-Ethylidene-Diphosphonate | | | | | |
| 17 | 0.01 | 0.580 | 15 | 29 | 14 |
| 18 | 0.05 | 0.570 | 17 | 34 | 17 |
| 19 | 0.10 | 0.565 | 41 | 85 | 44 |
| 20 | 0.15 | 0.560 | 73 | 203 | 130 |
| 21 | 0.20 | 0.550 | 162 | 305 | 143 |
| Additive: Tetrapotassium - 1 Hydroxy-Ethylidene-Diphosphonate | | | | | |
| 22 | 0.01 | 0.580 | 16 | 32 | 16 |
| 23 | 0.05 | 0.575 | 17 | 35 | 18 |
| 24 | 0.10 | 0.570 | 23 | 51 | 29 |
| 25 | 0.15 | 0.565 | 35 | 73 | 38 |
| 26 | 0.20 | 0.560 | 62 | 130 | 68 |
| Additive: Tetraammonium - 1 Hydroxy-Ethylidene-Diphosphonate | | | | | |
| 27 | 0.01 | 0.590 | 17 | 35 | 18 |
| 28 | 0.05 | 0.580 | 20 | 45 | 25 |
| 29 | 0.10 | 0.575 | 58 | 118 | 60 |

TABLE III-continued

| Test No. | Additive Dose p.p.h. of Plaster (dry) | Ratio $\frac{W}{P}$ to Have a Fixed Consistency (15 < $\phi$ < 16) | Flow Point in Minutes | Spread Point in Minutes | Finishing Time in Minutes |
|---|---|---|---|---|---|
| 30 | 0.15 | 0.570 | 136 | 201 | 65 |
| 31 | 0.20 | 0.565 | 150 | 230 | 80 |
| Additive: Tetratriethanolamine - 1 Hydroxy-Ethylidene-Diphosphonate | | | | | |
| 32 | 0.01 | 0.590 | 15 | 30 | 15 |
| 33 | 0.05 | 0.580 | 17 | 36 | 19 |
| 34 | 0.10 | 0.570 | 22 | 45 | 23 |
| 35 | 0.15 | 0.565 | 24 | 51 | 27 |
| 36 | 0.20 | 0.560 | 28 | 65 | 37 |

Table III shows clearly that the addition to the plaster mixing water of various water soluble salts of alkylene diphosphonic acids makes it possible to obtain sufficiently reduced setting rates (increase in the finishing time) at the same time as a reduction of the amount of water necessary to obtain a determined consistency.

EXAMPLE 4

The values of breaking stress on bending traction were determined according to the specifications of article 2.33 of standard NF/B 12-401, of "PFC 2" plaster modified by different doses of specified additive, on test pieces with a ratio W/P giving a determined and fixed consistency (15<$\phi$<16—see the paragraph on consistency test of example 1).

Table IV indicates the compositions prepared and tested.

The modes of keeping the test pieces after molding and before determination of the breaking stresses on bending traction were the following:
mode A: 2 hours in the laboratory atmosphere.
mode B: 7 days at 90% relative humidity
mode C: 7 days at 90% relative humidity then dried (24 in a drying oven O=50°±5° C.).

TABLE IV

| Composition Tested | Ratio $\frac{W}{P}$ to have Fixed Consistency (15 cm< $\phi$<16 cm) | Test No. | Mode of Keeping Test Samples | R = Breaking Stress on Bending Traction in Bars |
|---|---|---|---|---|
| Pure Plaster | 0.600 | 37 | A | 7.3 |
| | | 38 | B | 12.9 |
| | | 39 | C | 24.3 |
| Plaster Modified by: | | 40 | A | 10.2 |
| 0.05 p.p.h. dry HEDP/Plaster | 0.580 | 41 | B | 15.3 |
| | | 42 | C | 28.8 |
| Plaster Modified by: | | 43 | A | 11.4 |
| 0.1 p.p.h. Dry HEDP/Plaster | 0.565 | 44 | B | 17.7 |
| | | 45 | C | 30.6 |

HEDP: 1-Hydroxy Ethylidene Diphosphonic Acid

As can clearly be seen from Table IV, the compositions according to the invention are remarkably advantageous in that they make it possible to reduce considerably the amount of water necessary to have a fixed consistency and to increase the values of the breaking stresses of the plasters thus modified.

EXAMPLE 5

In each of these tests "PFC 2" plaster was mixed with distilled water at 20°±1° C. containing increasing doses of the various specified mixtures:

mixture A: 50/50 mixture of methylene diphosphonic acid and 1-hydroxyethylidene diphosphonic acid.
mixture B: 50/50 mixture of tetrasodium methylene diphosphonic acid and tetrasodium 1-hydroxy ethylene diphosphonate.
mixture C: 50/50 mixture of mixture A and mixture B.

(a) Consistency Test

The amount of water was determined in relation to the plaster so that a defined volume of the preceding mixtures would give a determined spread (15 cm<-$\phi$<16 cm) by the same mode of operation as in example 1.

(b) Test to Determine the Finishing Time

A series of the preceding compositions was prepared so that the ratio of water to plaster would be 0.6. Then the compositions were evaluated for their flow and spread points and their finishing time as described in example 2.

The results are shown in table V.

TABLE V

| Test No. | Dose of Additive/ p.p.h. Dry Plaster | Ratio $\frac{W}{P}$ to have a fixed Consistency (15 < $\phi$ < 16) | Flow Point in Minutes | Spread Point in Minutes | Finishing Time in Minutes |
|---|---|---|---|---|---|
| 46 | 0: Pure Plaster | 0.600 | 14 | 25 | 11 |
| Additive: Mixture A | | | | | |
| 47 | 0.01 | 0.585 | 17 | 38 | 21 |
| 48 | 0.05 | 0.580 | 25 | 65 | 40 |
| 49 | 0.10 | 0.565 | 80 | 145 | 65 |
| 50 | 0.15 | 0.560 | 110 | 200 | 90 |
| 51 | 0.20 | 0.555 | 180 | 300 | 120 |
| Additive: Mixture B | | | | | |
| 52 | 0.01 | 0.580 | 16 | 30 | 14 |
| 53 | 0.05 | 0.570 | 18 | 39 | 21 |
| 54 | 0.10 | 0.565 | 45 | 95 | 50 |
| 55 | 0.15 | 0.560 | 80 | 200 | 120 |
| 56 | 0.20 | 0.550 | 160 | 300 | 140 |
| Additive: Mixture C | | | | | |
| 57 | 0.01 | 0.585 | 18 | 38 | 20 |
| 58 | 0.05 | 0.575 | 23 | 58 | 35 |
| 59 | 0.10 | 0.565 | 60 | 120 | 60 |
| 60 | 0.15 | 0.560 | 95 | 205 | 110 |
| 61 | 0.20 | 0.550 | 175 | 320 | 145 |

Table V clearly shows that the mixtures of alkylene diphosphonic acids, mixtures of water soluble salts of alkylene diphosphonic acids and the mixtures of alkylene diphosphonic acids and of their water soluble salts, added to the plaster mixing water, make it possible to obtain sufficiently reduced setting rates (increase of finishing time) at the same time as they reduce the amount of water necessary to obtain a fixed consistency.

It will be obvious to those skilled in the art that various changes may be made without departing from the scope of the invention and the invention is not be be considered limited to what is described in the specification.

I claim:
1. A gypsum or anhydrite plaster composition, comprising said plaster and a small quantity sufficient to increase finishing time while reducing the quantity of water necessary and increasing mechanical strength, of an additive of at least one alkylene diphosphonic acid, or water soluble salt thereof, represented by the following general formula:

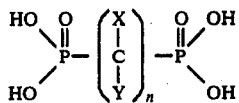

wherein X is a hydrogen atom or a lower alkyl group containing from 1 to 4 carbon atoms, Y is a hydrogen atom, a hydroxy radical or a lower alkyl group containing from 1 to 4 carbon atoms and n is a whole number between 1 and 10, inclusive.

2. Plaster compositon in accordance with claim 1, wherein said alkylene diphosphonic acid is methylene diphosphonic acid, ethylidene diphosphonic acid, isopropylidene diphosphonic acid, 1-hydroxy ethylidene diphosphonic acid, hexamethylene diphosphonic acid, trimethylene diphosphonic acid, decamethylene diphosphonic acid, 1-hydroxy propylidene diphosphonic acid, 1,6-dihydroxy-1,6-dimethyl hexamethylene diphosphonic acid, 1,4-dihydroxy-1,4-diethyl tetramethylene diphosphonic acid, 1,3-dihydroxy-1,3-dipropyl trimethylene diphosphonic acid, 1,4-dibutyl tetramethylene diphosphonic acid, dihydroxy diethylethylene diphosphonic acid, tetrabutylbutylene diphosphonic acid, or 4-hydroxy-6-ethyl-hexamethylene diphosphonic acid.

3. Plaster composition in accordance with claim 1 wherein said water soluble salt of said alkylene diphosphonic acid is an alkali metal salt, an ammonium salt or an amine salt.

4. A plaster composition in accordance with claim 1 further comprising sufficient water to provide a predetermined consistency, and wherein said quantity of additive comprises 0.001–2 parts of dry additive per hundred parts of said plaster.

5. A plaster composition in accordance with claim 4 wherein said additive is present in an amount of 0.005–0.5 parts of dry additive per hundred parts of plaster.

6. Process of preparing and using compositions of gypsum plaster or plaster base mixtures, comprising either premixing dry with the plaster when it is in powder form, or adding to the plaster mixing water when it is in liquid form, an additive composition comprising at least one alkylene diphosphonic acid, or water soluble salt thereof, represented by the formula:

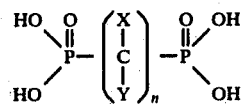

wherein X is a hydrogen atom or a lower alkyl group containing from 1 to 4 carbon atoms, Y is a hydrogen atom, a hydroxy radical or a lower alkyl group containing from 1 to 4 carbon atoms and n is a whole number between 1 and 10, inclusive, with a content of said additive composition ranging between 0.001 and 2 parts per hundred, the content expressed in dry material in relation to the plaster.

7. A process in accordance with claim 6 wherein said additive composition is added in an amount of 0.005–0.5 parts of dry additive composition per hundred parts of plaster.